Figure 3:
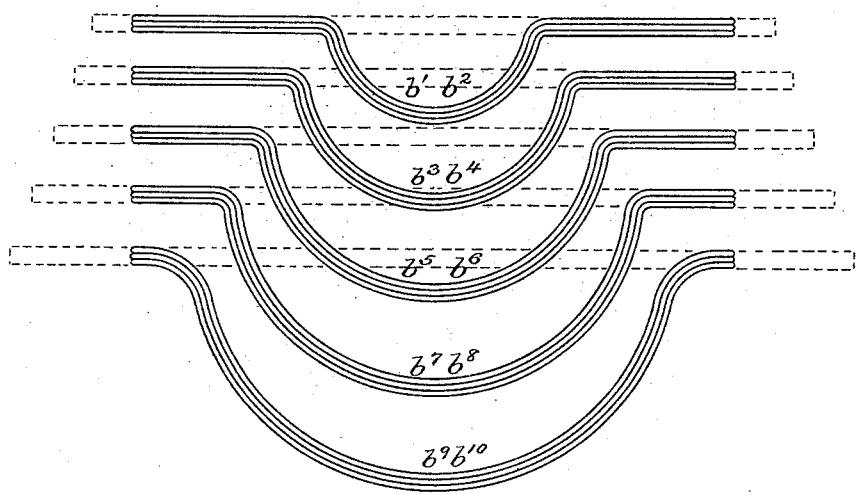

(No Model.) 6 Sheets—Sheet 1.
R. EICKEMEYER.
ARMATURE FOR DYNAMO ELECTRIC MACHINES.
No. 525,698. Patented Sept. 11, 1894.
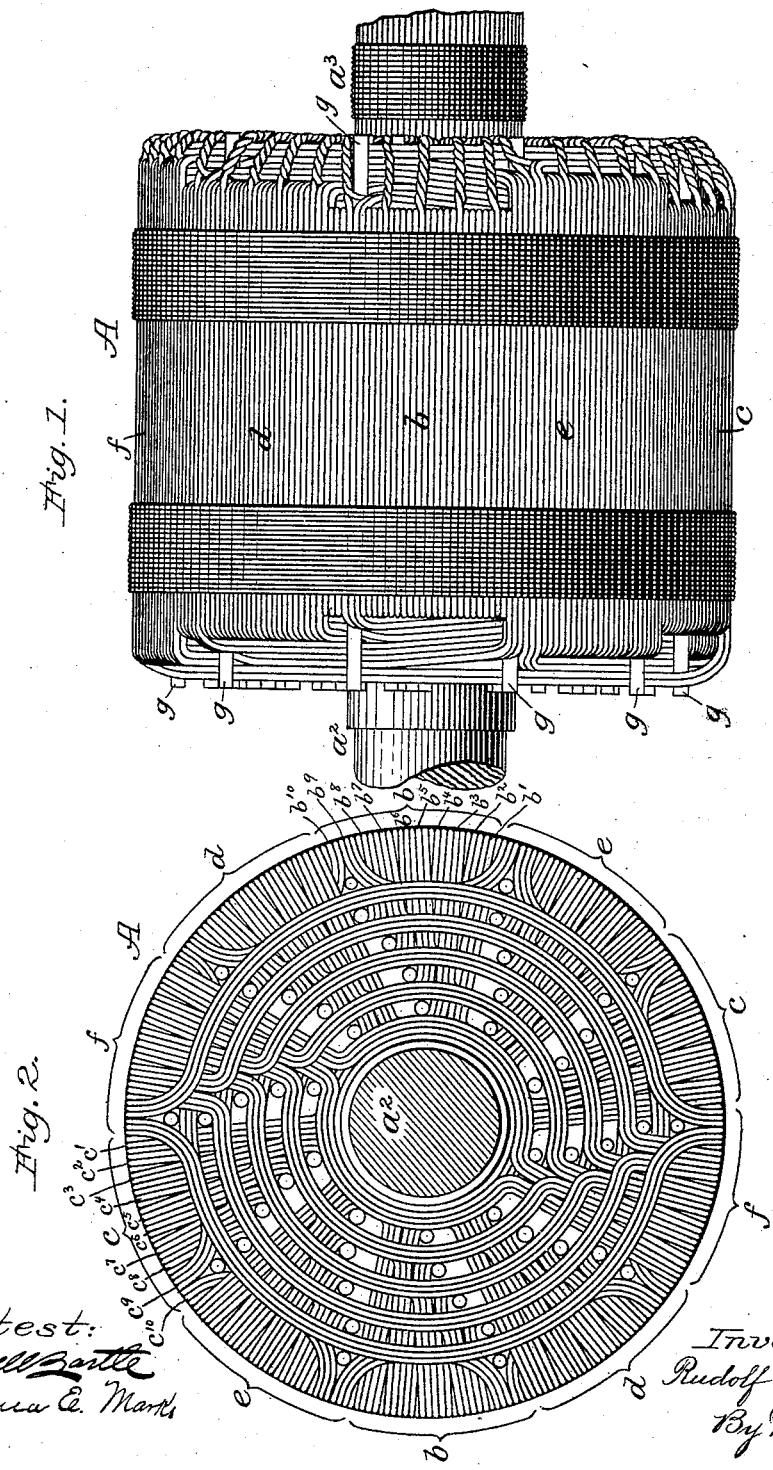
Attest:
Nowell Bartle
Emma E. Marks
Inventor:
Rudolf Eickemeyer.
By Wm C Ward
Attorney (No Model.) 6 Sheets—Sheet 2.
R. EICKEMEYER.
ARMATURE FOR DYNAMO ELECTRIC MACHINES.

No. 525,698. Patented Sept. 11, 1894.

Attest:
Howell Bartt
Emma E. Marks

Inventor:
Rudolf Eickemeyer
By M. C. Ward
Attorney (No Model.)  6 Sheets—Sheet 3.

R. EICKEMEYER.
ARMATURE FOR DYNAMO ELECTRIC MACHINES.

No. 525,698. Patented Sept. 11, 1894.

Attest:
Howell Bartle
Emma E. Marks

Inventor:
Rudolf Eickemeyer
By   
Attorney

THE NORRIS PETERS CO., PHOTO-LITHO., WASHINGTON, D. C.

(No Model.) 6 Sheets—Sheet 5.
R. EICKEMEYER.
ARMATURE FOR DYNAMO ELECTRIC MACHINES.

No. 525,698. Patented Sept. 11, 1894.

Attest:
Howell Bartle
Emma E. Marks

Inventor:
Rudolf Eickemeyer.
By M. C. Ward
Attorney (No Model.) 6 Sheets—Sheet 6.
R. EICKEMEYER.
ARMATURE FOR DYNAMO ELECTRIC MACHINES.
No. 525,698. Patented Sept. 11, 1894.
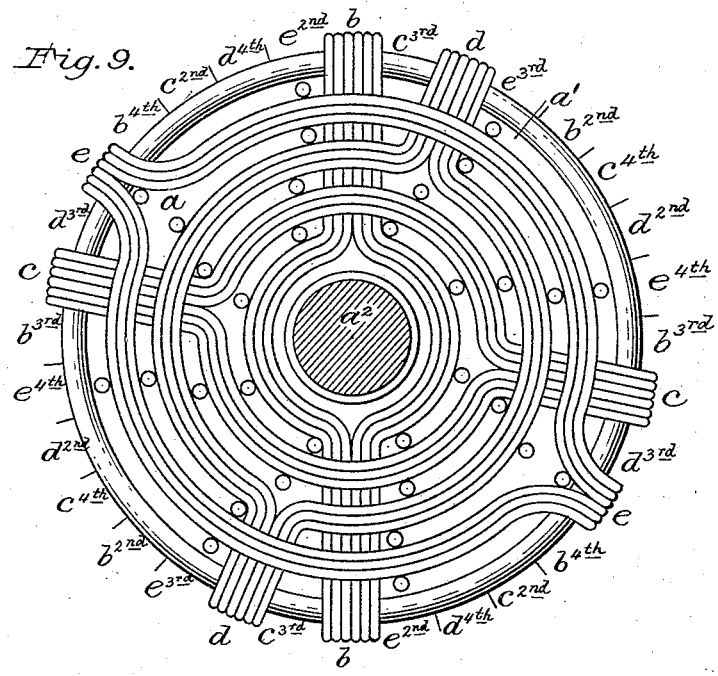
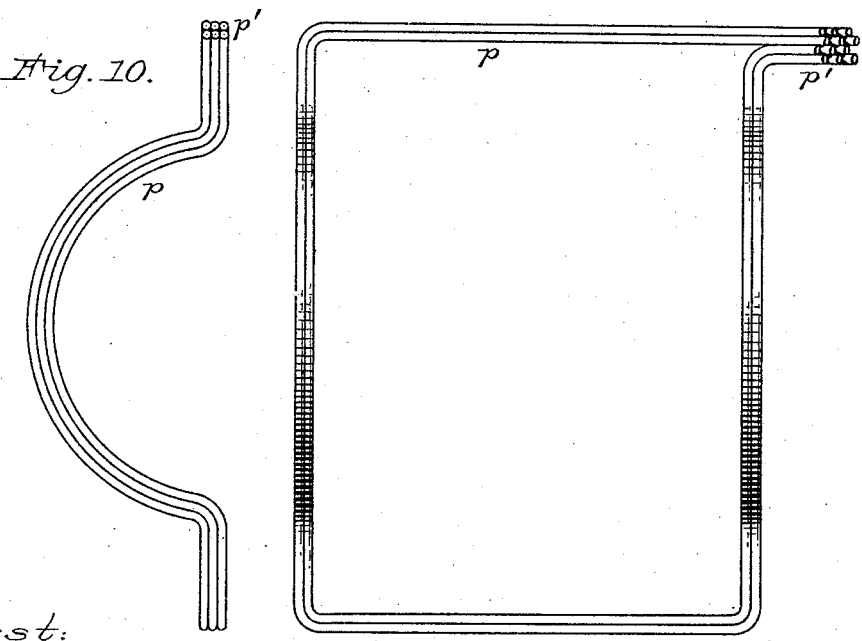
Attest:
Nowell Bartlett
Emma E. Marks
Inventor:
Rudolf Eickemeyer
By Wm C. Wood
Attorney

UNITED STATES PATENT OFFICE.

RUDOLF EICKEMEYER, OF YONKERS, NEW YORK.

ARMATURE FOR DYNAMO-ELECTRIC MACHINES.

SPECIFICATION forming part of Letters Patent No. 525,698, dated September 11, 1894.

Application filed April 3, 1894. Serial No. 506,175. (No model.)

*To all whom it may concern:*

Be it known that I, RUDOLF EICKEMEYER, of Yonkers, in the county of Westchester and State of New York, have invented certain new and useful Improvements in Dynamo-Electric Machines; and I do hereby declare that the following specification, taken in connection with the drawings furnished and forming a part of the same, is a clear, true, and complete description of my invention.

My said improvements pertain to armatures and their windings, and they are applicable to both bi-polar, and multi-polar machines, and especially to such as embody drum armatures. My novel windings, belong to that general class, wherein specially formed coils or sections are first produced, and then assembled upon the armature core, as distinguished from that older class, wherein each section is composed of wire which is initially and directly wound upon the armature core and made to conform thereto, and to also conform at their ends to the preceding section or sections, with a corresponding bunching or rounding at the heads of the armature.

The objects of my invention are to produce electrically and mechanically balanced armatures; also to secure the several coils or sections of winding against displacement on the armature core, under the strains incident to service; also to provide an abundance of air spaces among the ends of the coils or sections, at the ends of the armature, for ventilating and cooling the winding, and also to enable the construction of the coils or sections, as well as their assemblage on cores, to be done economically and by comparatively unskilled labor.

My novel armature winding, whether in a bi-polar, or in a multi-polar armature, differs radically from any other winding known to me, in many respects; as for instance, in that each commutated division thereof, embodies groups, or series of complete specially formed coils or winding sections, which in pairs, contain an equal length of wire, with no two pairs, in any one group or series of pairs, containing the same length of wire; also, in that in one form of my winding said pairs of coils or sections, are grouped together at their sides in their assemblage on an armature core, and are uniform as to the length of their sides, which lie along the face of the armature, or in notches therein although differing as to the length of wire in each pair; also in that, in another form of my winding, or in other words another assemblage of my novel coils, the pairs of coils in each series, intervene at their sides, between longer or shorter pairs of coils belonging to other series, instead of having the coils of one length grouped together at their sides; also in that the sides of the coils in any one group or series, differ in their length from the sides of the coils or sections in any other group or series; also in that the coils or sections have ends which are variably curved or bent, and are substantially rectangular in their outline, their sides and ends being parallel respectively with the face of the armature core and its ends; also in that, each coil or section, has near its two sides at its ends, radial portions of equal length, said radial portions in the coils of a group or series, varying in their length, according to whether the intervening curved portion be long or short; also in that, the coils when assembled, have their correspondingly curved portions arranged in as many concentric lines, as there are variably curved coils, in the winding; also in that, the ends of the coils, in the same group or series, either underlie or overlie the ends of coils of other groups or series, and so also do the ends of coils in each group, either underlie, or overlie the ends of coils in the same group or series; and also in that at the ends of the armature, air space is provided beneath the ends of the coils, by means of laterally projecting annular flanges on the armature core at its ends adjacent to its periphery.

To more particularly describe my invention, I will refer to the accompanying drawings, in which—

Figure 4:
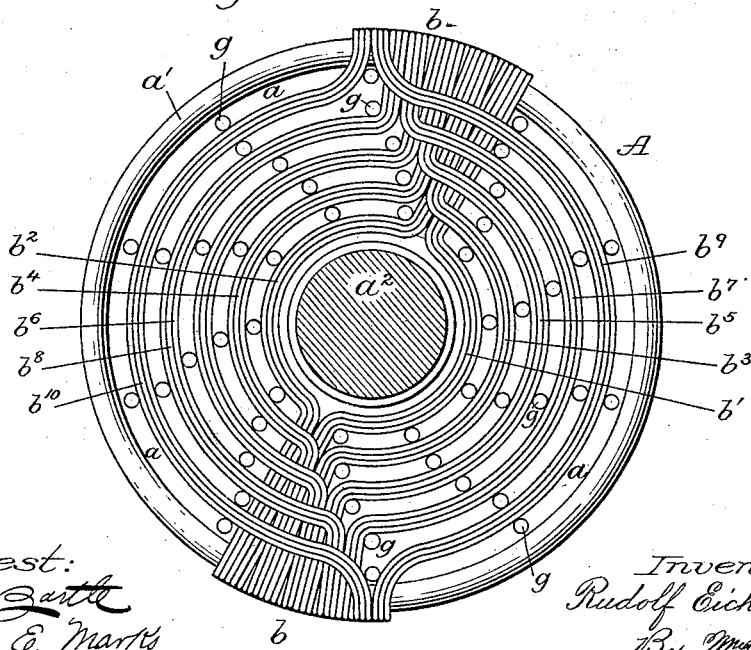
Figure 5:
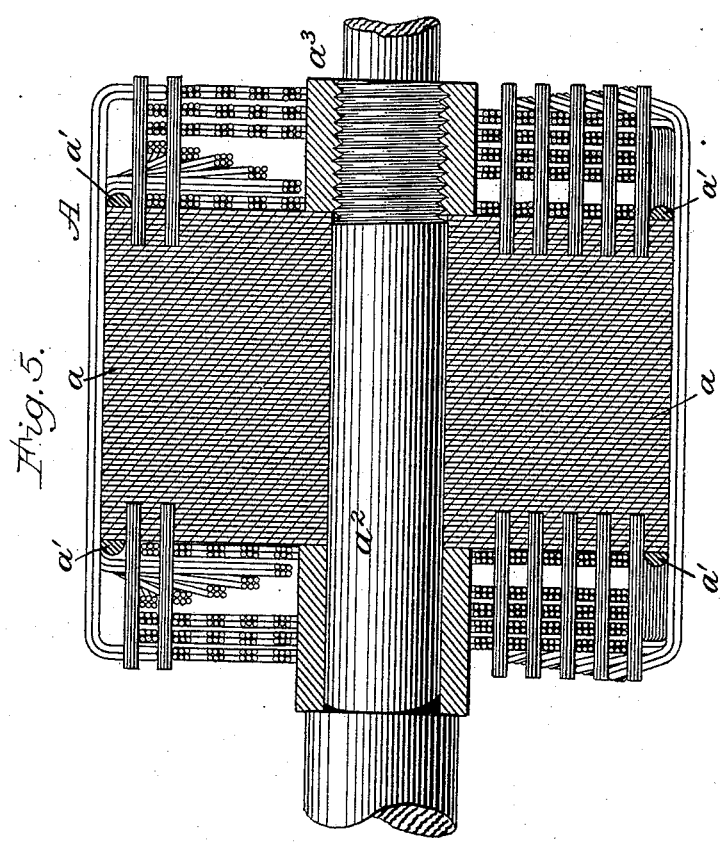
Figure 6:
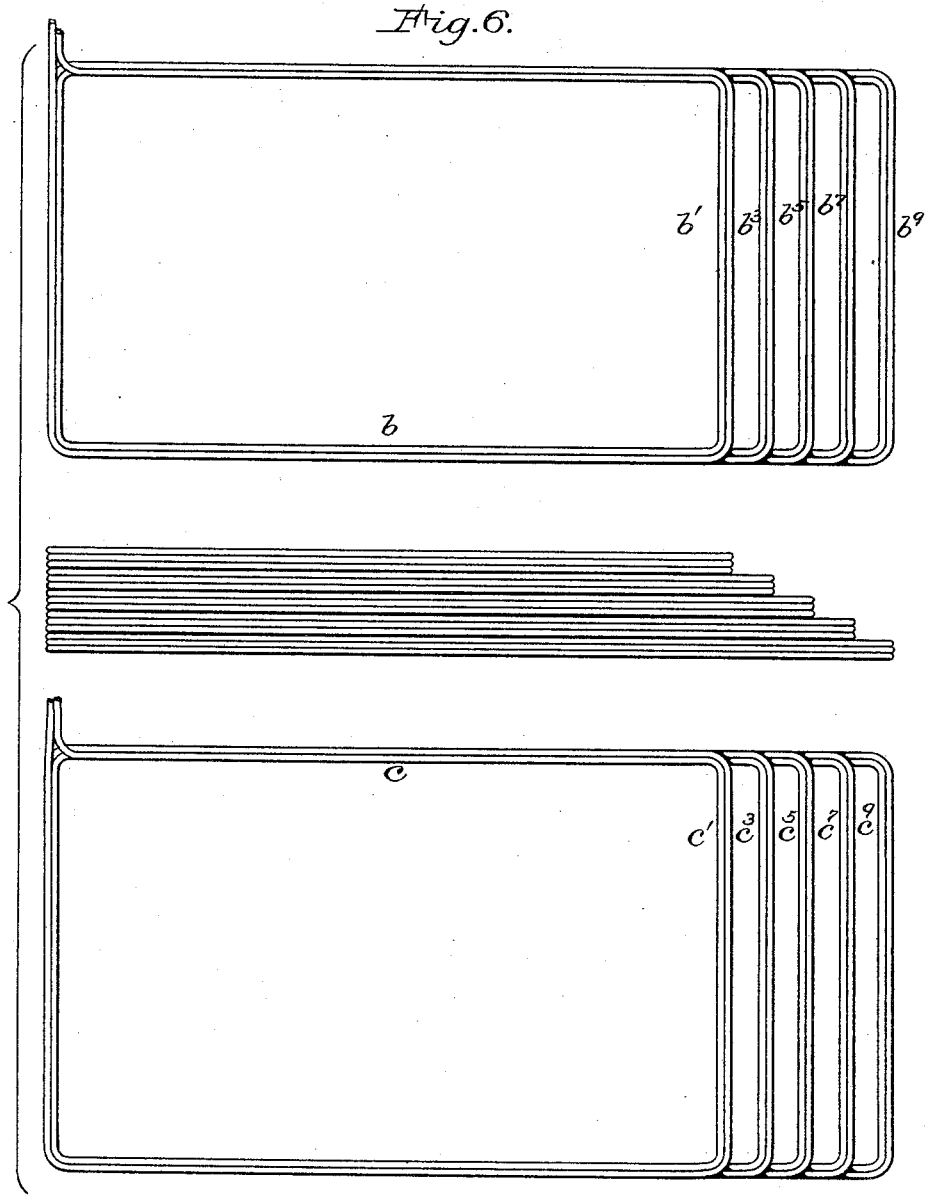
Figure 7:
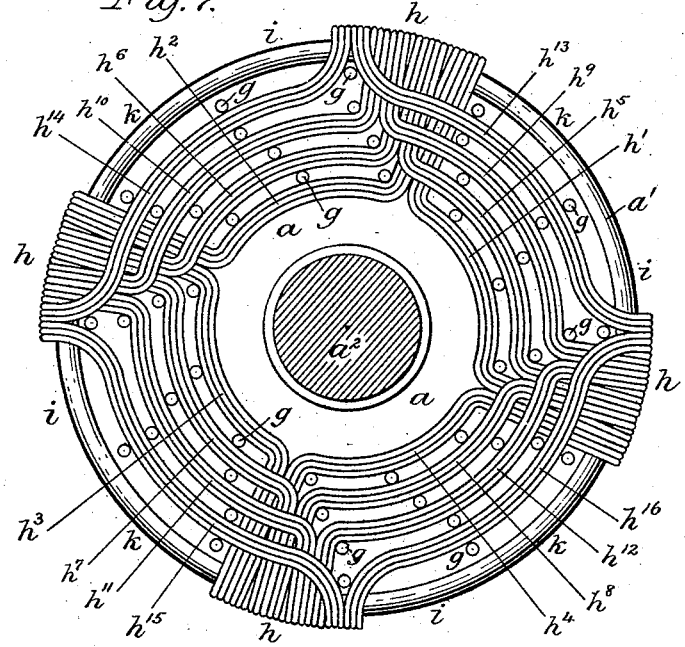
Figure 8:
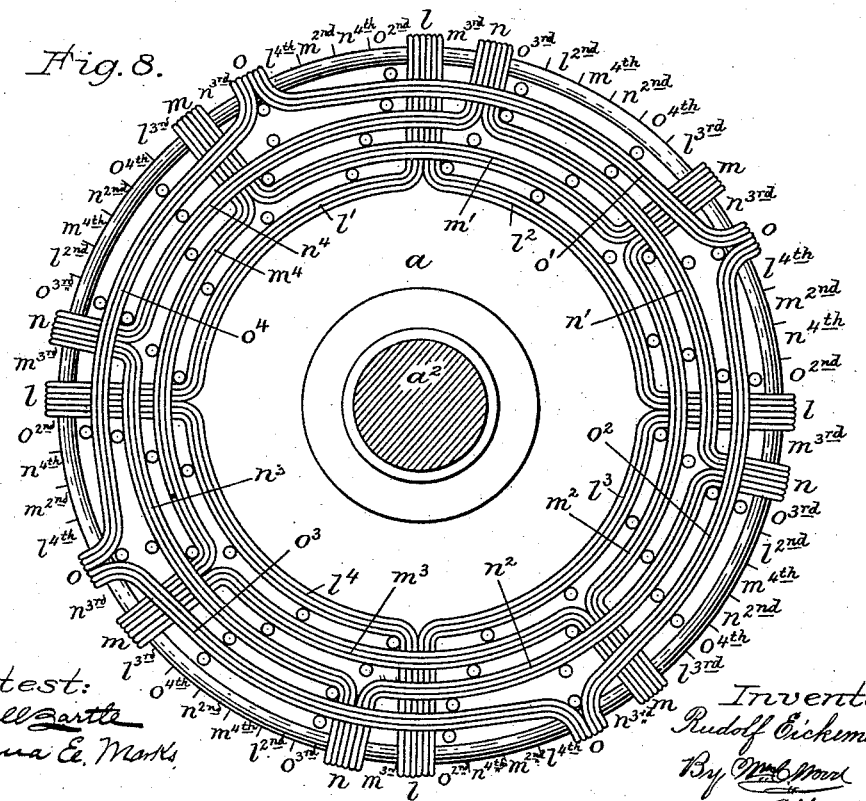

Figure 1. in side view, illustrates a bi-polar armature embodying my invention. Fig. 2. is a view of the same at the end opposite the commutator. Fig. 3. in end view illustrates five coils, arranged in consecutive order for indicating the variations in the curves at the ends of the coils in the several groups; the variations in the end dimensions of the coils, before receiving their bends being here indicated in dotted lines. Fig. 4. is an end view of the armature core with one group of coils or winding sections applied thereto. Fig. 5. is a central longitudinal section of the armature. Fig. 6. illustrates in two top views, piles of initially formed coils belonging to adjacent groups, before their ends have been curved or bent, and also in side view, this being applicable to either pile. Fig. 7. is an end view of a partially wound multi-polar armature. Fig. 8. is an end view of a partially covered multi-polar armature, illustrating a different mode of assembling the coils or sections. Fig. 9. is an end view of a partially covered bi-polar armature illustrating the assemblage of the coils or sections, after the manner illustrated in Fig. 8. Fig. 10. in two views illustrates a winding section embodying wire in a single turn.

Referring to Figs. 1, to 6, inclusive it will be understood that the armature A, has a core $a$, composed of soft iron disks as heretofore, but that as a novel feature each of the two ends of the core is provided at or near the periphery with an annular laterally projecting flange $a'$, $a'$, preferably composed of any good solid non-conducting material, although metal could be employed, with preference for that which is not magnetic. These flanges are well rounded at their edges, and enable the winding to be separated from the ends of the armature, between the flanges and the appropriate armature shaft $a^2$, on which the commutator would be carried, adjacent to the several winding terminals at $a^3$. This bi-polar armature A, has fifty coils or sections of winding, each in this instance containing six turns of wire, three wide and two deep, and their several terminals, are shown twisted together in appropriate pairs, at the commutator end $a^3$, of the armature. These fifty coils, are divided into five groups, which are consecutively lettered $b$, $c$, $d$, $e$ and $f$. in the order of their application to the core, and it is to be understood that the sides of the coils lie on the periphery or face of the armature core, and that the ends of the coils are at, and overlie the ends of the core. Each group, contains ten coils, of which, five at their ends, lie on the one side of the armature shaft $a^2$, at the ends of the core, and five on the other side.

The coils of the group $b$, as clearly indicated in Fig. 1, are uniform in length, but are shorter than any of the others, the coils $c$, being the next greater in length, and so on, to the coils of group $f$, which are the longest coils in the winding. Taking for instance, the group $b$, of Figs. 1, and 2, and specially shown in Fig. 4, it will be readily understood, that the several coils are applied to the core $a$, in the order of their lettering, $b'$, $b^2$, and $b^3$, $b^4$, &c., up to $b^9$, $b^{10}$, each two thus adjacent, constituting a pair of counterpart coils, which contain an equal length of wire; as for instance, coils $b'$, and $b^2$, are alike, in every respect, and the same is true of the coils $b^3$, and $b^4$, and so on, but it will be seen in each instance, that the odd numbered coils of each pair curve at the one side, and the even numbered coils curve at the other side of the axis $a^2$, and it will also be seen that the coils in each group, are bent at their ends Figs. 3, and 4, on five different curves, the smaller curve, as at $b'$, $b^2$, being precisely the same as in the coils $c'$, $c^2$, and $d'$, $d^2$, and so on, and hence as shown in Fig. 2, all of the curved portions of the ends of the coils, lie in five different curves or arcs, this number being in this instance equal to one half the number of coils in each group or series. It will be seen also, that the end of each coil, or section, is radial at each side of its curved portion, and that these radial portions differ in length or extent according to the arc line length of the curved portions. It will now be seen on reference to Fig. 1, that the coils of the group $c$, are as much longer than those in group $b$, as will enable the ends of the latter to be overlaid by the former, and that in like manner, the coils of the group $d$, are similarly longer than those of group $c$, and hence the ends of the coils $d$, overlie the ends of coils $b$, and $c$, and so on, up to the coils of the group $f$, which are the longest coils in the winding; and therefore all of the ends of the other coils, lie between the ends of the armature core, and the ends of these coils $f$.

The particular description given of the pairing of coils in the group $b$, will apply to the pairing of coils in all the other groups, each coil bearing a number, which conforms to that of the corresponding coil in each of the other groups. It will also be seen, that at each end of the armature (Fig. 2,) the curved portion of each coil, is coincident with the curved portions of corresponding coils in other groups or series, thus providing for extensive concentric air spaces between the curved portions of the ends of the coils; also that liberal radial air spaces between the groups are provided and also extensive air spaces, within the annular flanges $a'$, $a'$, (Fig. 5,) thus securing desirable ventilating and cooling effects. The locking of the coils to the core, is effected by numerous pins or studs $g$, occupying suitable holes in the armature core, and each pin, not only engages with the outer curved surface of many coils, but in some cases, also with the side or sides of the radial portions of the ends of the coils, thus thoroughly guarding against all displacing strains whether torsional or centrifugal.

I will now describe the initial or rudimentary form in which each coil or section is developed, preparatory to bending its ends. Referring to Fig. 6, it is to be understood that the upper portion thereof, illustrates a piled up group of rudimentary coils, such for instance as would be formed into coils of the group $b$, the letters of reference corresponding therewith. The lower portion of said figure, in like manner illustrates rudimentary coils for the group $c$, the same being appropriately designated. The central portion of this figure, is a side view of the two piles of coils shown in the two top views. It will be seen that all of these rudimentary coils, are rectangular in form, and oblong, and that the coils at the c, pile are wider than those at the b, pile, this width corresponding to the length desired in the finished coil, and it will of course be understood, that the long sides of the rudimentary coils, become the curved ends of the finished coils, and that the differences in length of the rudimentary coils, correspond with the differences due to the variations in the radial portions and in the curves or bends at the ends of the finished coils. It will now be readily understood, that the rudimentary coils for a bi-polar armature, are in one-half as many diffent lengths, as there are finished coils required in any one group or series, and also in as many different widths, as there are groups or series, so that for instance, for the winding described, twenty-five simple rectangular formers would be required, each having an outline corresponding with the interior of the particular rudimentary coil required. It will of course be understood, that the number of groups or series of coils on an armature core may be widely varied, as well as the number of coils in each group or series, as will be now made apparent in the description of the multi-polar winding illustrated in Fig. 7. In this four pole armature winding, there are forty-eight coils, of which sixteen are shown in position, all of which are of equal length at their sides, along the periphery or face of the armature core $a$. In this case, the term group, as previously employed extends throughout the sixteen coils shown, because eight coils at one portion of the core, occupy at one side, a grouped relation precisely as in the bi-polar armature while the other sides of the same eight coils, occupy similar grouped relations to eight other coils, and hence in this group $h$, there are two pairs, or four coils $h'$, $h^2$, $h^3$, $h^4$, which not only contain an equal length of wire, but more wire than is contained in either of the others. The four coils $h^5$, $h^6$, $h^7$, and $h^8$, contain the next lesser length of wire, followed by the four coils $h^9$, $h^{10}$, $h^{11}$, and $h^{12}$, the shortest length of wire being in the coils $h^{13}$, $h^{14}$, $h^{15}$, and $h^{16}$. It will now be seen that the four coils $h'$, $h^2$, $h^3$, $h^4$, which contain the most wire, are first applied to the core, whereas the corresponding coils $b'$, $b^2$, of the bi-polar winding contained the least wire, the graduated variation in the length being here reversed. It will be readily understood that another similar group will occupy the four spaces at $i, i, i, i$, on the core, and still another, the spaces at $k, k, k, k$, thus covering the armature, the coils of group $i$, being longer than those of group $h$, and those of group $k$, being longer than those of group $i$, and all of them are locked in position by pins, as at $g$, as before described. It is however to be understood, that the coils need not always be thus grouped, either in a bi-polar or in a multi-polar winding, as illustrated for instance in the multi-polar armature Fig. 8. In this winding, there are sixty-four coils in four series of sixteen coils each. Each series, includes coils differing in form at their ends, and also as to the length of wire therein, but they are uniform as to their length; i. e., their sides at the face of the armature are uniform in length. As here shown, the sixteen coils of the first series, have been applied to the armature core, and it will be seen, that instead of having the sides of all the coils of even length, grouped at four different points, as in Fig. 7, the coils are here alike in length, but have the sides of the several coils $l'$, $m'$, $n'$, and $o'$, regularly separated, so that the sides of longer coils of the second, third, and fourth series, will, when applied, be intervened between the sides of the coils of the first series, at the face of the armature. The four coils $l'$, $l^2$, $l^3$, and $l^4$, are first applied to the core $a$; then the four coils $m'$, $m^2$, $m^3$, and $m^4$. Then follow the four coils $n'$, $n^2$, $n^3$, and $n^4$, and finally in this series, the four coils $o'$, $o^2$, $o^3$, and $o^4$, are applied these being held in place by more or less of the several pins $g$. The next or second series of coils are sufficiently longer than the first, to enable the second series to overlie the first, and the next four coils of the $l$, form, will have their sides respectively located at the four points indicated at $l^2$, those of the $m$ form at $m^2$, the $n$ form at $n^2$, and the $o$ form at $o^2$. In the next series, the sides of the coils of the $l$ form, will be located at the four points, $l^3$, the $m$ form, at $m^3$, the $n$ form, at $n^3$, and the $o$ form at $o^3$ and in like manner, will each four coils of the fourth series, have their sides located respectively, at $l^4$, $m^4$, $n^4$, and $o^4$.

Referring now to the sixteen coils of the first series here shown to be in place, it will be seen that radial portions of the $l'$, coils are overlaid by all of the other coils, and hence the curved ends of these others are slightly deflected, to the extent of the thickness of the $l$, coils, this slight deflection being possible, notwithstanding the fact, that all are of the same length at the face of the armature. It will also be seen, that the coils of the second series will be as much longer than those of the first, as will enable their ends, to overlie the two thicknesses of coils at the two ends of the core, and so on with appropriate increase of length, in the coils of the third and fourth series. This system of arranging the coils, is not restricted to multi-polar armatures, but is equally applicable to bi-polar windings, as is illustrated in Fig. 9. As here shown, the winding is composed of thirty-two coils or winding sections, in four series of eight coils each, the first series having been applied to the core $a$. As these coils are like those shown in Figs. 1, to 5, in the matter of form, they will be designated by letters of reference similar to those heretofore used on the same forms. These pairs of coils $b$, $c$, $d$, and $e$, are all of the same length on the face of the armature, whereas in Fig. 2, the coils so designated, differ in length. These coils constituting the first series of this winding, vary as to the length of wire therein, as do the coils in each of the several groups $b$, $c$, $d$, and $e$, first described. The curved ends of the coils $c$, $d$, and $e$ here overlie the radial portions of the coils $b$, and involve the slight deflection of the ends of each of the other coils, referred to, in connection with the multi-polar windings last described, so also do the radial ends of the coils $c$, underlie the curved portions of the coils, $d$, and $e$ the latter also overlying the radial portions of the coils $d$. The coils $b$, of the second series, are longer than those of the first, and will have their sides located at the points indicated at $b^2$ on the face of the armature; the sides of the coils $c$, of the second series, will be located at $c^2$, the sides of the coils $d$, at $d^2$, and the coils $e$, at $e^2$. In like manner will the other coils of the third and fourth series be respectively located appropriately at $b^3$, $b^4$; $c^3$, $c^4$; $d^3$, $d^4$; and $e^3$, $e^4$, thus symmetrically clothing the armature. It will now be readily understood, that the clothing of other multi-polar armatures will or need involve no variation either in the form of the coils, or in the length of their sides relatively to the length of the core, or in the matter of assemblage. It will be obvious that these disclosures will be ample for the guidance of persons skilled in the art, in applying this system of winding to any drum armature, regardless of the number of its commutated divisions.

All of the armatures shown are alike, as to the several hereinbefore recited novel, features, some of which will be here repeated. Each commutated division contains pairs of coils containing wire in equal length; in each group or series of coils, all of the coils have sides, equal in length at the face, of the armature; no two pairs of coils in a group, or in commutated divisions of a series, contain the same length of wire; at all times in each armature, coils containing an equal length of wire, will be beneath the commutating brushes, and there will be an equal length of wire in the coils between the brushes, thus securing electrical balance; the coils although varying in the length of wire therein, and consequently in their weight, are so symmetrically disposed in their assemblage, as to secure a mechanical balance of the armature; any one coil, in any one group or series has a side, portion alongside of the side portion of another coil in the same group or series, at the face of the armature.

All of the coils or winding sections are rectangular in outline, in having sides and ends, which are substantially parallel with the face of the armature and its ends, respectively, but have their ends variably radial, and variably curved or bent, and the correspondingly curved ends, in all of the groups, or series occupy concentric lines, at the ends of the armature, and afford ample intervening concentric air spaces, and between the several radial and curved portions of the coils, or sections, ample spaces are afforded for the reception of locking pins or studs; and in each case, the annular flanges on the ends of the core, afford air spaces between the core and the ends of the coils, but it is to be understood that the omission of said flanges will involve no departure from the main features of my invention.

The several winding sections thus far described, contain many turns or convolutions of wire, and hence they are true coils, but it is to be understood that each section may contain only a single turn of wire, or many wires of a single turn each, as for instance, as illustrated in Fig. 10, where the section $p$, is composed of six wires, in one turn each, but the massed wires at the terminals $p'$, may be securely tied and such sections can then be assembled like the others.

Having thus described my invention, I claim as new and desire to secure by Letters Patent—

1. The combination substantially as hereinbefore described, of a suitable core and an armature winding composed of specially formed coils or sections, which are rectangular in their outline, are counterparts in pairs, and are assembled in groups or series, in each of which, the coils are of equal length on the face of the core, and differ in length from the coils of other groups or series, as and for the purposes specified.

2. The combination substantially as hereinbefore described, of a suitable core, and an armature winding, composed of specially formed coils, which are rectangular in their outline, are assembled in groups or series of coils, each group or series differing from the others as to the length of the sides of the coils therein, and in each group or series, coils which at their ends, are variably radial and variably curved, and have their curved portions on the heads of the armature, coincident with the curved portions of the correspondingly curved coils in all of the other groups or series, as and for the purpose specified.

3. The combination substantially as hereinbefore described of an armature core provided at each end with a laterally projecting annular flange near its periphery, and a winding composed of specially formed coils or sections, said flanges affording air spaces between the ends of the core and the ends of the coils.

4. In an armature winding, groups or series of specially formed rectangular coils or sections, the coils in either group, differing in length from coils in the other groups, and having a side portion of each coil of each group, beside the side portion of another coil in the same group or series at the face of the armature.

5. In a bi-polar armature winding, groups of specially formed rectangular coils having sides of equal length in each group, but differing in such length from the coils of other groups, the several sides of the coils in each group lying side by side at the face of the armature substantially as described.

6. A bi-polar armature winding composed of specially formed rectangular coils, or sections, assembled in groups, and having the ends of the coils in each group equally divided and located at opposite sides of the armature substantially as described.

7. An armature winding composed of specially formed rectangular coils, or sections, assembled in groups or series the coils of each group or series, differing in the length of their sides from the coils of other groups or series, each group containing coils which are counterparts in pairs, as to the length of wire therein, the length of their sides, and in the curvatures at their ends, and have their curved ends located at opposite sides of the armature shaft, substantially as described.

RUDOLF EICKEMEYER.

In presence of—
JAMES S. FITCH,
O. B. WARING.